(12) United States Patent
Huang et al.

(10) Patent No.: US 7,024,428 B1
(45) Date of Patent: Apr. 4, 2006

(54) RELIABLE DATA SYNCHRONIZATION OVER UNRELIABLE NETWORKS

(75) Inventors: Alex Xueyuan Huang, San Jose, CA (US); Luca Andrea Castellano, Los Gatos, CA (US)

(73) Assignee: Openwave Systems Inc., Redwood City, CA (US)

( * ) Notice: Subject to any disclaimer, the term of this patent is extended or adjusted under 35 U.S.C. 154(b) by 496 days.

(21) Appl. No.: 09/920,232

(22) Filed: Jul. 31, 2001

Related U.S. Application Data (60) Provisional application No. 60/271,081, filed on Feb. 23, 2001.

(51) Int. Cl.
*G06F 17/30* (2006.01)

(52) U.S. Cl. .................. 707/201; 707/10; 707/103; 709/248

(58) Field of Classification Search ............. 707/1–10, 707/100–104.1, 200–206; 709/248, 217, 709/219, 246, 223–225, 229; 714/12, 15, 714/20; 715/500.1
See application file for complete search history.

(56) References Cited

U.S. PATENT DOCUMENTS

| | | | |
|---|---|---|---|
| 4,866,611 A | 9/1989 | Cree et al. | |
| 5,327,555 A | 7/1994 | Anderson | |
| 5,566,069 A | 10/1996 | Clark, Jr. et al. | |
| 5,598,536 A | 1/1997 | Slaughter, III et al. | |
| 5,649,195 A | 7/1997 | Scott et al. | |
| 5,666,530 A | 9/1997 | Clark et al. | |
| 5,684,990 A | 11/1997 | Boothby | |
| 5,706,509 A | 1/1998 | Man-Hak Tso | |
| 5,710,922 A | 1/1998 | Alley et al. | |
| 5,727,159 A | 3/1998 | Kikinis | |
| 5,727,202 A | 3/1998 | Kucala | |
| 5,742,820 A | 4/1998 | Perlman et al. | |
| 5,761,439 A | 6/1998 | Kar et al. | |
| 5,832,489 A | 11/1998 | Kucala | |
| 5,870,765 A * | 2/1999 | Bauer et al. ................ | 707/203 |
| 5,884,323 A | 3/1999 | Hawkins et al. | |
| 5,884,325 A * | 3/1999 | Bauer et al. ................ | 707/201 |
| 5,926,816 A * | 7/1999 | Bauer et al. ................ | 707/8 |
| 5,928,329 A | 7/1999 | Clark et al. | |
| 5,974,238 A | 10/1999 | Chase, Jr. | |

(Continued)

OTHER PUBLICATIONS

"Wireless Application Protocol, Wireless Session Protocol Specification", WAP WSP, Version 30, Apr. 1998, pp. 1-95.

*Primary Examiner*—Shahid Alam
*Assistant Examiner*—Jean Bolte Fleurantin
(74) *Attorney, Agent, or Firm*—Blakely, Sokoloff, Taylor & Zafman LLP (57) ABSTRACT

A centralized synchronization system synchronizes data stored in multiple devices distributed over a relatively unreliable network, to provide automatic recovery from synchronization failures. The synchronization system maintains a truth database indicating the true state of the data and action tables indicating actions to be performed on each of the devices during a next update of the data. Data is retrieved from the devices over the network, and actual states of the data are determined from the action tables and the retrieved data. The truth database and action tables are updated accordingly. An effective action table is then generated to account for any of the devices which were offline during the most-recent synchronization. The truth database and effective action tables are saved to a central database in an atomic transaction. The effective action tables are then used to update the data on the devices over the network.

25 Claims, 10 Drawing Sheets

U.S. PATENT DOCUMENTS

| | | |
|---|---|---|
| 6,000,000 A | 12/1999 | Hawkins et al. |
| 6,006,274 A | 12/1999 | Hawkins et al. |
| 6,044,381 A | 3/2000 | Boothby et al. |
| 6,052,735 A | 4/2000 | Ulrich et al. |
| 6,067,551 A * | 5/2000 | Brown et al. ............... 707/203 |
| 6,125,369 A | 9/2000 | Wu et al. |
| 6,131,096 A | 10/2000 | Ng et al. |
| 6,151,606 A | 11/2000 | Mendez |
| 6,212,529 B1 | 4/2001 | Boothby et al. |
| 6,223,187 B1 | 4/2001 | Boothby et al. |
| 6,295,541 B1 * | 9/2001 | Bodnar et al. ............... 707/203 |
| 6,487,560 B1 * | 11/2002 | LaRue et al. ............... 707/203 |
| 6,516,327 B1 | 2/2003 | Zondervan et al. |
| 6,581,075 B1 * | 6/2003 | Guturu et al. ............... 707/201 |

* cited by examiner

RELIABLE DATA SYNCHRONIZATION OVER UNRELIABLE NETWORKS

This application claims the benefit of Provisional U.S. Patent application No. 60/271,081, filed on Feb. 23, 2001, and entitled, "Method for Reliable Data Synchronization over Unreliable Networks", which is incorporated herein by reference.

FIELD OF THE INVENTION

The present invention pertains to techniques for performing synchronization of data on multiple devices. More particularly, the present invention relates to synchronization of data on two or more devices, at least one of which is on a wireless network or other relatively unreliable network.

BACKGROUND OF THE INVENTION

In recent years, portable electronic devices, such as laptop computers, Personal Digital Assistants (PDAs) (e.g., a Palm Pilots), and cellular telephones, have gained widespread use. These devices are frequently used, among other reasons, to carry personal information such as address books and calendars. It is not unusual for one person to own two or more such devices, often in addition to a personal computer (PC). Consequently, users of such devices generally prefer to add, delete, or modify data on one device and see the changes automatically reflected in their other devices. In response to this preference, the industry has developed data synchronization methods and standards.

Typical data synchronization methods operate based on the assumption that communication among devices is reliable, i.e., that data will not be lost during transmission and that communication links will not fail. This is a reasonable (albeit occasionally inaccurate) assumption in the context of wired serial links and networks. Wireless links are far less reliable, however, and are likely to remain so for some time. A wireless link can fail due to many possible reasons, such as interference from nearby buildings and other structures, terrain and other electronic devices, or traveling outside service area boundaries. If synchronization fails, it may be difficult or impossible for a user to make manual adjustments to the data from a mobile device to correct for the failure.

It is expected that within a short time, wireless links will be the predominant connection medium between personal electronic devices. It is crucial, therefore, that these devices be capable of synchronizing their data without errors, even when communication links fail or devices on the network are offline.

SUMMARY OF THE INVENTION

The present invention includes a method and apparatus to synchronize states of data between a number of devices over an unreliable communication channel. In the method, data is retrieved from the devices. Based on the data retrieved from the devices, centrally stored data is updated so as to automatically recover from a prior synchronization failure, if any. The data states on the devices are then updated based on the updated centrally stored data, including communicating with at least one of the devices over the unreliable communication channel.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for fault-tolerant synchronization of data between two or more devices, at least one of which is on a relatively unreliable network, are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As used herein, an "unreliable" network is a network which is appreciably more subject to communication failures (even though such failures may have short duration) than a conventional, wired communications network. One example of an unreliable network is a conventional wireless telecommunications network, such as used for cellular telephony. Note, however, that the fault-tolerant synchronization techniques described herein are not limited to use with a wireless network.

The techniques described herein assure that data will be accurately synchronized among two or more devices, even if a communication link fails or a device is switched off during synchronization. As described in greater detail below, this goal is accomplished by operating a centralized synchronization system which maintains a "truth database" indicating the true state of the data and "action tables" indicating actions to be performed on each of the devices the next time the data is updated. During a synchronization process, the synchronization system first retrieves the data to be synchronized from each of the online devices, via the network, and determines actual states of the data on the devices based on the action tables and the retrieved data. The synchronization system updates the truth database and action tables accordingly. The synchronization system then generates an effective action table for any of the devices which were offline during the previous synchronization. The truth database and effective action tables are then stored in an atomic transaction. The synchronization system then use the effective action tables to update the data on the devices over the network. As will be more apparent from the details which follow, this process provides automatic recovery from synchronization failures, such as may result from failure of communication links or devices being offline during synchronization.

Figure 1:
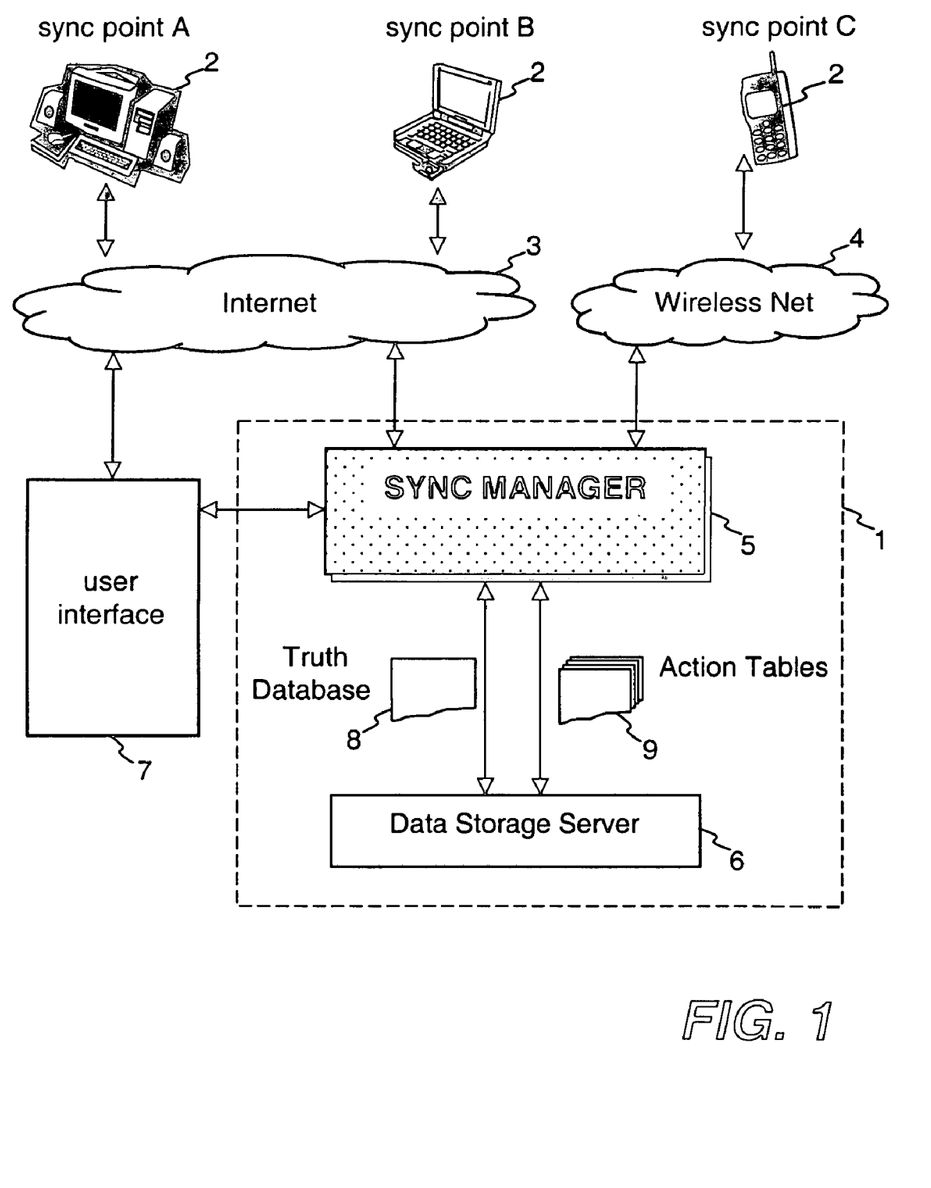
FIG. 1 illustrates a network environment in which the present invention can operate.

FIG. 1 shows an example of a network environment in which this technique may be implemented. A centralized synchronization ("sync") system 1 synchronizes a set of data between a number of remote sync points 2. In one embodiment, synchronization is performed using SyncML. A "sync point" is a user device containing data to be synchronized. The sync system 1 may be implemented in one or more physical computing platforms, which may be one or more conventional server-class computers and/or personal computers (PCs). Some of the sync points 2 are connected to the sync system 1 via the Internet 3. However, one or more other sync points 2 are connected to the sync system 1 via a wireless network 4, which may be a conventional wireless telecommunications network. The sync points 2 on the Internet 3 may include devices such as conventional desktop and laptop PCs, while the sync points 2 on the wireless network 4 may include devices such as cellular telephones, PDAs, laptop computers, and two-way pagers.

The sync system 1 includes a sync manager 5 and a data storage server (DSS) 6 coupled to the sync manager 5. The sync manager 5 coordinates the synchronization process. The sync manager 5 also generates a conventional user interface 7, to allow users of sync points on the Internet to add, delete, and modify their data and to initiate synchronization. The DSS 6 stores and retrieves binary large objects and (BLOBs) "atomically"; that is, the DSS 6 guarantees that when an element is written or updated, it will either update completely, or it will not update at all. In an embodiment which handles personal information manager (PIM) data (i.e., personal contact data), one BLOB is created for each user, containing all of the contact information belonging to that user. To facilitate description, it is henceforth assumed in this description that the data to be synchronized is PIM data. It will be recognized, however, that the techniques described herein can be used to synchronize essentially any type of data between multiple devices.

The sync manager 5 constructs a truth database 8 reflecting the sync manager's notion of what the true, synchronized state of all the sync points 2 should be, based on the information available to the sync manager 5 from the sync points 2. The sync manager 5 also maintains an action table 9 for each sync point 2, to record the changes that need to be made to each sync point 2 in order to make the data on the sync points 2 consistent with the truth database. When the data on all of the sync points 2 are consistent with the data in the truth database, synchronization is complete.

Each entry in an action table contains an operator, and (in some cases) associated data. The operator is one of: NO_CHANGE, ADD, DELETE or UPDATE. Action table entries using the ADD and UPDATE operators also have data associated with the operator.

To facilitate implementation, the action tables for the various sync points 2 can be separate only in a logical sense; that is, they may be defined logically within a single, larger action table, if desired. If so, each entry in the action table also contains a sync point identifier (SPID), which uniquely identifies the sync point to which that entry applies.

Figure 2:
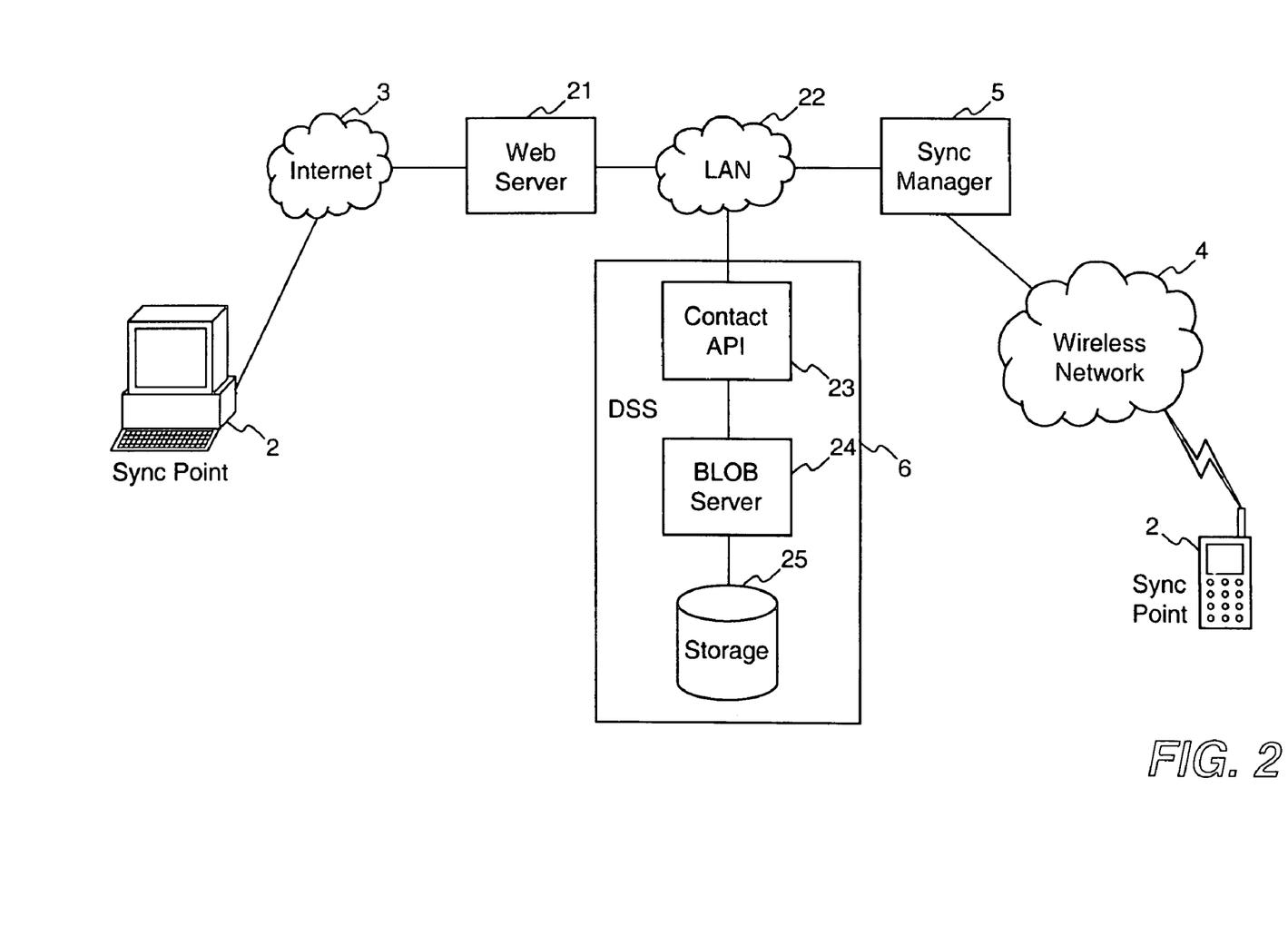
FIG. 2 illustrates a physical implementation of the environment in which the invention operates.

FIG. 2 illustrates an example of the physical implementation of the environment in which the invention operates. In the embodiment of FIG. 2, the sync system 1 includes the sync manager 5, the DSS 6, and a conventional World Wide Web server 21 (hereinafter simply "Web server 21"), all coupled to each other on a LAN 22. The user interface 7 in FIG. 1 may take the form of a conventional Web page, which is provided to a sync point 2 by the Web Server 21. The Web Server 21 is connected to a sync point 2 (a PC in this case,) via the Internet 3.

The sync manager 5 communicates with at least one mobile synch point 2 (e.g., a cellular telephone) via the wireless network 4. Although not shown as such in FIG. 2, the sync manager 5 may be coupled to the wireless network 4 via the Internet 3 or some other wired network. In that case, communication between the sync manager 5 and the wireless network 4 may be carried out through a gateway (not shown) that provides an interface between the wireless 4 network and the Internet 3. Such a gateway may operate to allow wireless devices to access the Web, email, and other services that require Internet access. Hence, such a gateway may perform functions such as translation of data between hypertext markup language in (HTML) and wireless markup language in (WML) and translating protocols between hypertext transfer and protocol (HTTP) and wireless accessed protocol (WAP), or other similar conversions. Such a gateway can be implemented using, for example, the Mobile Access Gateway software, available from Openwave Systems of Redwood City, Calif., with conventional server-class computer hardware.

As shown in FIG. 2, the DSS 6 may include a contact application program interface (API) 23, a BLOB server 24, and a data storage facility 25. The BLOB server 24 is a conventional database server that provides access to contact records stored in the data storage facility 25. The data storage facility 25 is any conventional device (or multiple devices) suitable for the non-volatile mass storage of data. The contact API 23 is an API which allows communication of personal contact data (names, addresses, telephone numbers, etc.) between the BLOB server 24 and elements external to the DSS 6. The BLOB server 24 allows atomic reads and writes of BLOBs to the data storage facility 25. The details of the contact API 23 and the BLOB server 24 are not necessary for an understanding of the present invention and are well within the abilities of those skilled in the art, given this disclosure.

Figure 3:
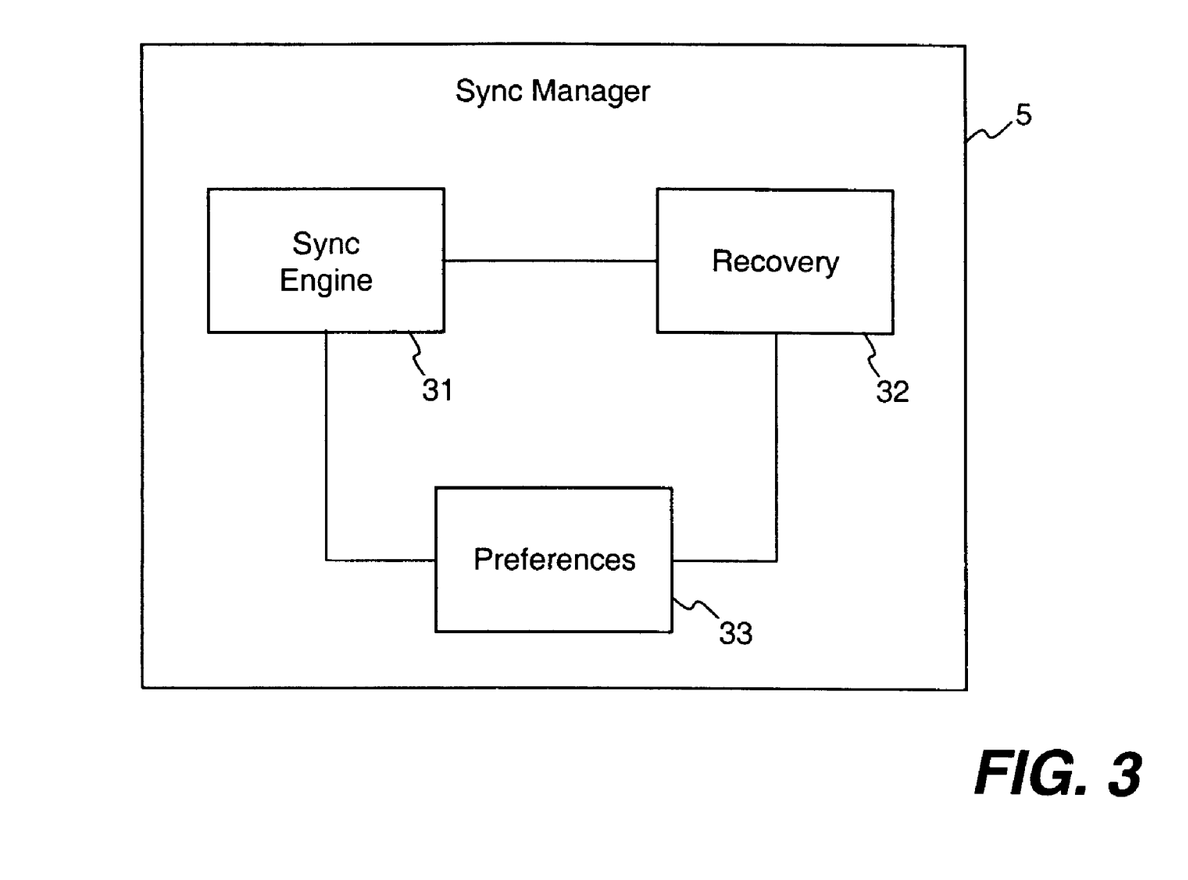
FIG. 3 shows the elements of the sync manager, according to one embodiment.

FIG. 3 shows the elements of the sync manager 5, according to one embodiment. As shown, the sync manager 5 includes a sync engine 31, a recovery module 32, and a preferences module 33. The sync engine 31 is a conventional data synchronization engine, which is responsible for propagating changes between sync points, resolving conflicting states between two or more sync points, and detecting duplicate records. The recovery module 32 provides the fault-tolerance features described herein. The preferences module 33 allows user preferences to be set (e.g., prioritization of sync points for purposes of conflict resolution). In one embodiment, the sync engine 31, recovery module 32 and preferences module 33 are embodied as separate software-implemented processes of the sync manager 5.

Figure 4:
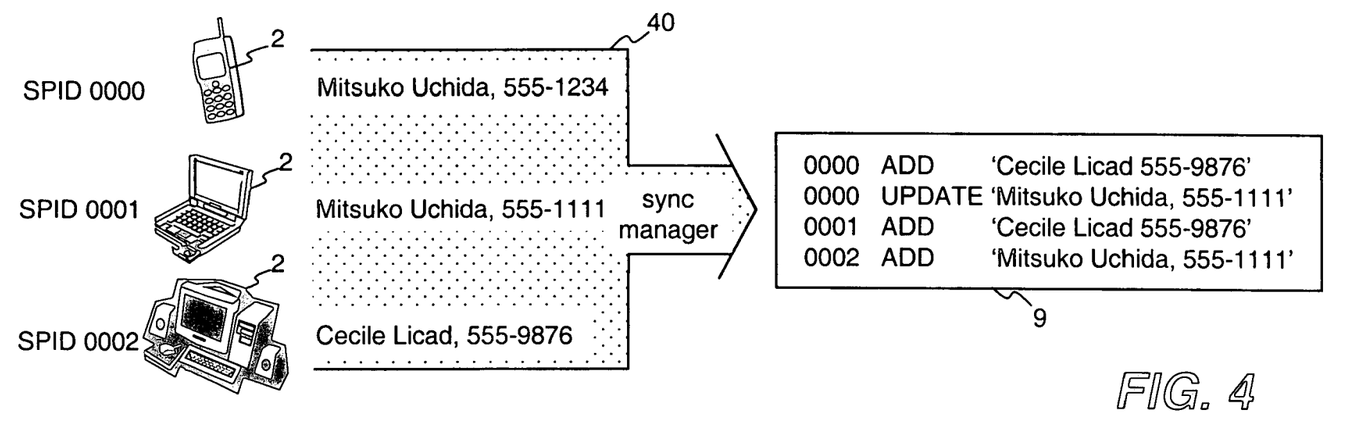
FIG. 4 shows the state of each of multiple devices and the action table in an initial state.
Figure 5:
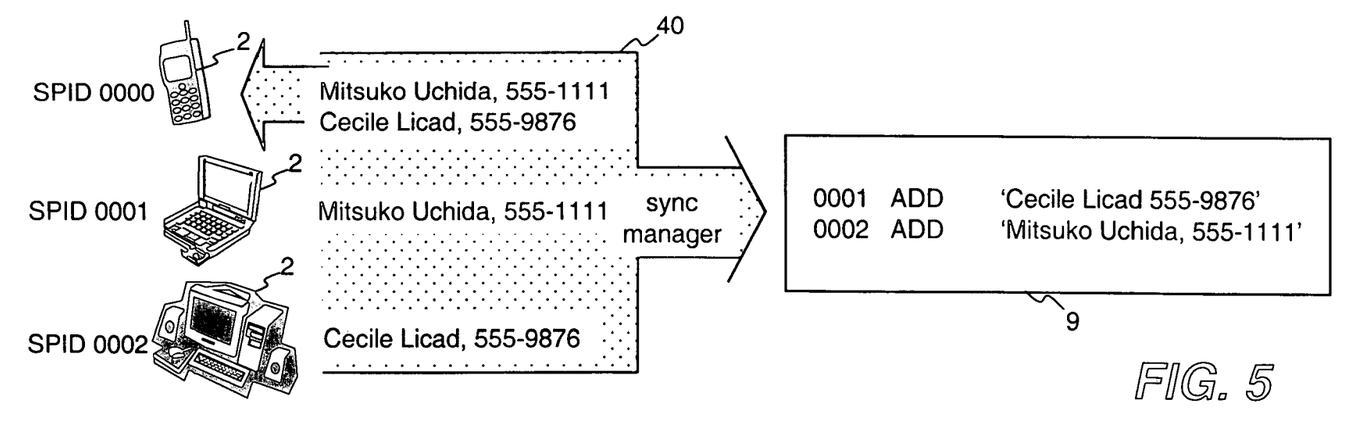
FIG. 5 shows the state of each device and the action table after the cell phone has been successfully updated.
Figure 6:
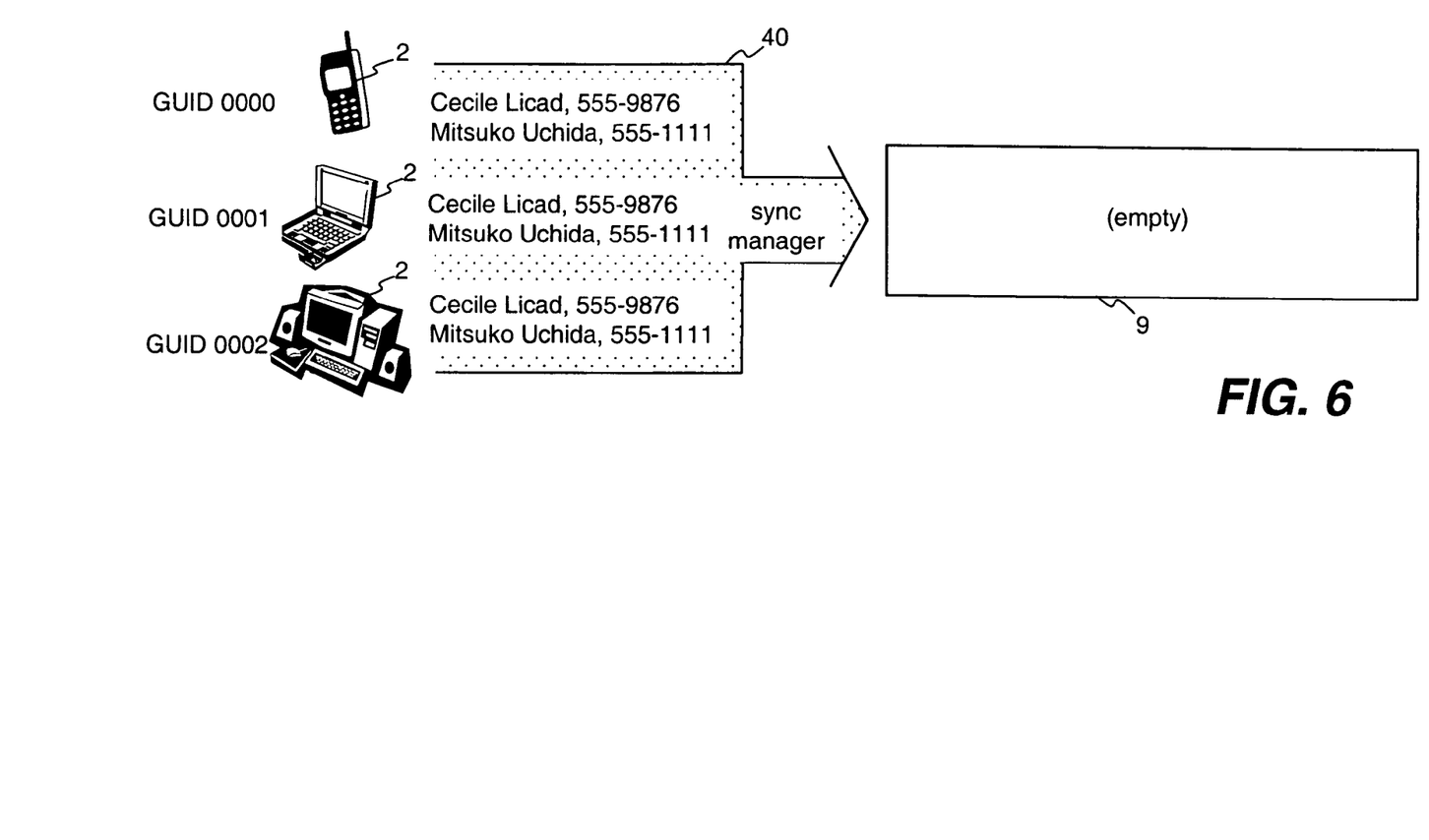
FIG. 6 shows the state of the system after synchronization is complete.

FIGS. 4, 5 and 6 collectively illustrate a simple example of the use of the synchronization technique described herein, in which no failure occurs. Reference numeral 40 indicates the data states on each of the three sync points 2. To facilitate description, a single action table 9 is used for all sync points 2 in this example, rather than separate action tables for each sync point 2. Each entry in the action table 9 is associated with a particular sync point 2 using a four-digit SPID.

FIG. 4 shows the initial PIM state of three sync points 2, i.e., a cell phone, a notebook computer, and a desktop computer, and the action table 9. FIG. 5 shows the PIM state of each sync point 2 and the action table 9 after the data on the cell phone has been successfully updated (i.e., to update the telephone number of Mitsuko Uchida), based on the second entry in the action table 9. FIG. 6 shows the state of the system after synchronization is complete. Each sync point 2 has the same contact data and the action table 9 is empty.

In this example, every component and communication link worked as expected. That is, all of the communication links delivered their data without errors, and every sync point and network element stayed online and worked correctly. In practice, however, failures will sometimes occur during synchronization. Some of the possible failure modes are: the machine running the sync manager 5 fails, the DSS 6 fails, the network connection between the sync manager 5 and the DSS 6 fails, or the network connection with a sync point 2 (wired or wireless) fails during synchronization.

Typical synchronization methods do not necessarily recover from these failures. Failure of current systems to recover from network and device lapses can result in the loss and/or corruption of user data. The result is often dissatisfied users. The technique described herein assures that user data will not be corrupted even if such failures occur.

The technique can be viewed as having three main aspects. First, the truth database is built from three elements: the truth database from the previous synchronization, the current sync point state, and any incomplete actions from previous synchronizations. This aspect of the technique provides the ability to recover from a failed synchronization.

The second aspect is that, after constructing the truth database and the action table, but before updating any of the sync points, the sync manager 5 writes both the truth database and the action table to the DSS 6 in anatomic transaction. When the sync manager 5 receives an acknowledgement from a sync point 2 that that device has successfully synchronized, the sync manager 5 removes the corresponding entries from the action table and writes the revised truth database and action table back to the DSS 6. This aspect of the technique ensures that proper recovery information is always available.

The third aspect is that, during a synchronization, when a sync point 2 is offline and there is an old action table for that sync point 2, the old action table is combined with the new action table to form an effective action table to be used during the next synchronization.

Figure 7:
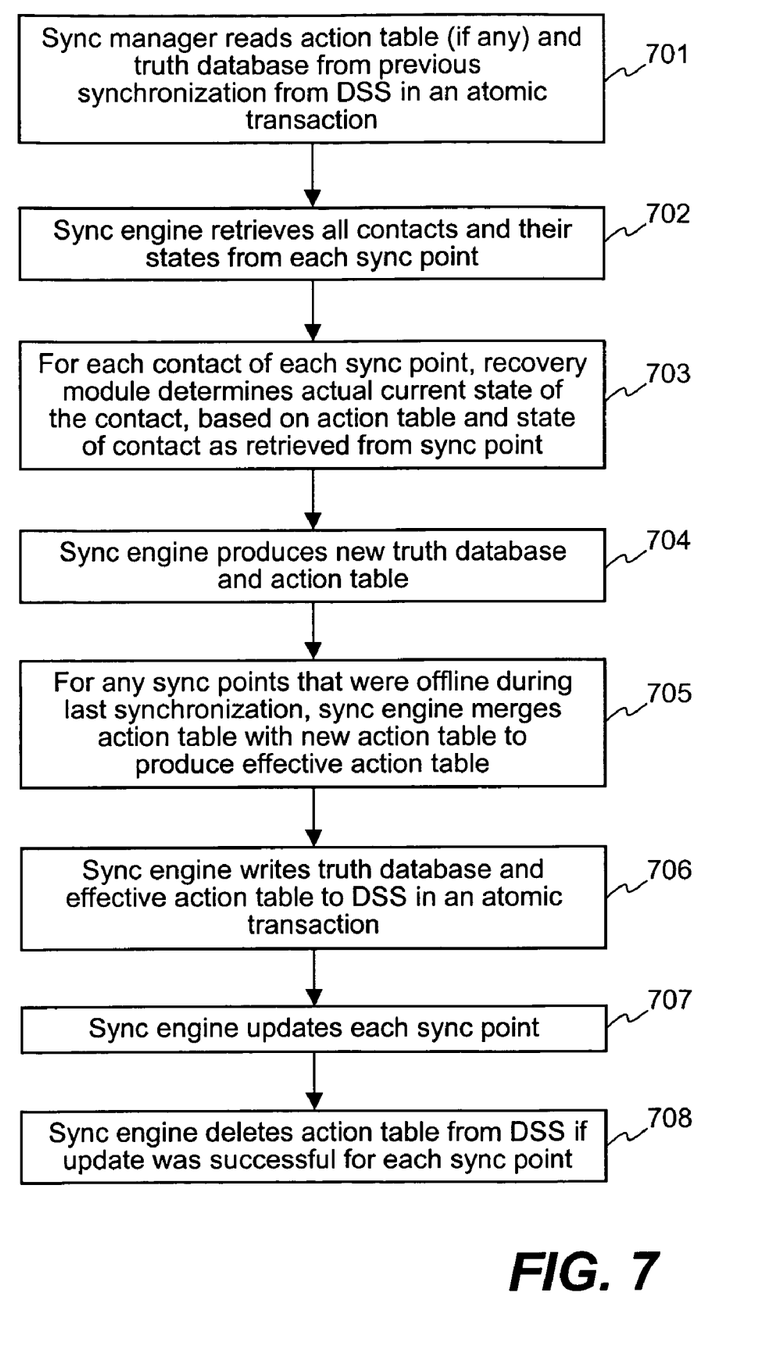
FIG. 7 is a flow diagram illustrating an overall process for assuring reliable synchronization over an unreliable network, according to one embodiment.

FIG. 7 illustrates a top-level process to assure reliable synchronization, according to one embodiment of the present invention. The illustrated sequence is performed at each synchronization. Synchronization may be either user-initiated (e.g., by the user activating a predetermined control on a sync point) or server-initiated. Note that a two-stage process is employed to assure persistence of data, even in the event of a server failure: first, information is gathered from all sync points 2 to determine the truth database and action table; then, data is written to the DSS 6 and to the sync points 2. If a failure occurs before the data can be written to the DSS 6, the sync manager 5 may simply declare all data modified since the last synchronization to be invalid and reinitiate the process.

Initially, at processing block 701 the sync manager 5 reads from the DSS 6, in anatomic transaction, the truth database and any action tables remaining from a previous synchronization. At block 702 the sync engine 31 retrieves all contacts and their states from each of the sync points. At block 703 the recovery module 32 determines, for each contact of each sync point 2, the actual current state of the contact data on the sync point. This determination is made based on both the action table for the sync point and the state of the contact as retrieved from the sync point, as described further below. The sync engine 31 then produces a new truth database and action tables for each of the sync points 2 at block 704. At block 705, the sync engine 31 produces an effective action table for each sync point that was offline (if any) during the last synchronization. Any effective action table is produced by merging the previous action table with the new action table for each such sync point 2, as described further below. Next, at block 706 the sync engine 31 writes the truth database and the effective action tables to the DSS 6 in anatomic transaction. For purposes of this write operation, the effective action table of any sync point which was online during the previous synchronization is simply the new action table produced in block 704. At block 707 the sync engine 31 updates each sync point 2 in succession, via the appropriate network, using well-known, conventional techniques, in which each step of the update requires acknowledgement from the sync point being updated. Finally, at block 708 the sync engine 31 deletes the action table of each sync point 2 for which the update was successful.

Figure 8A:
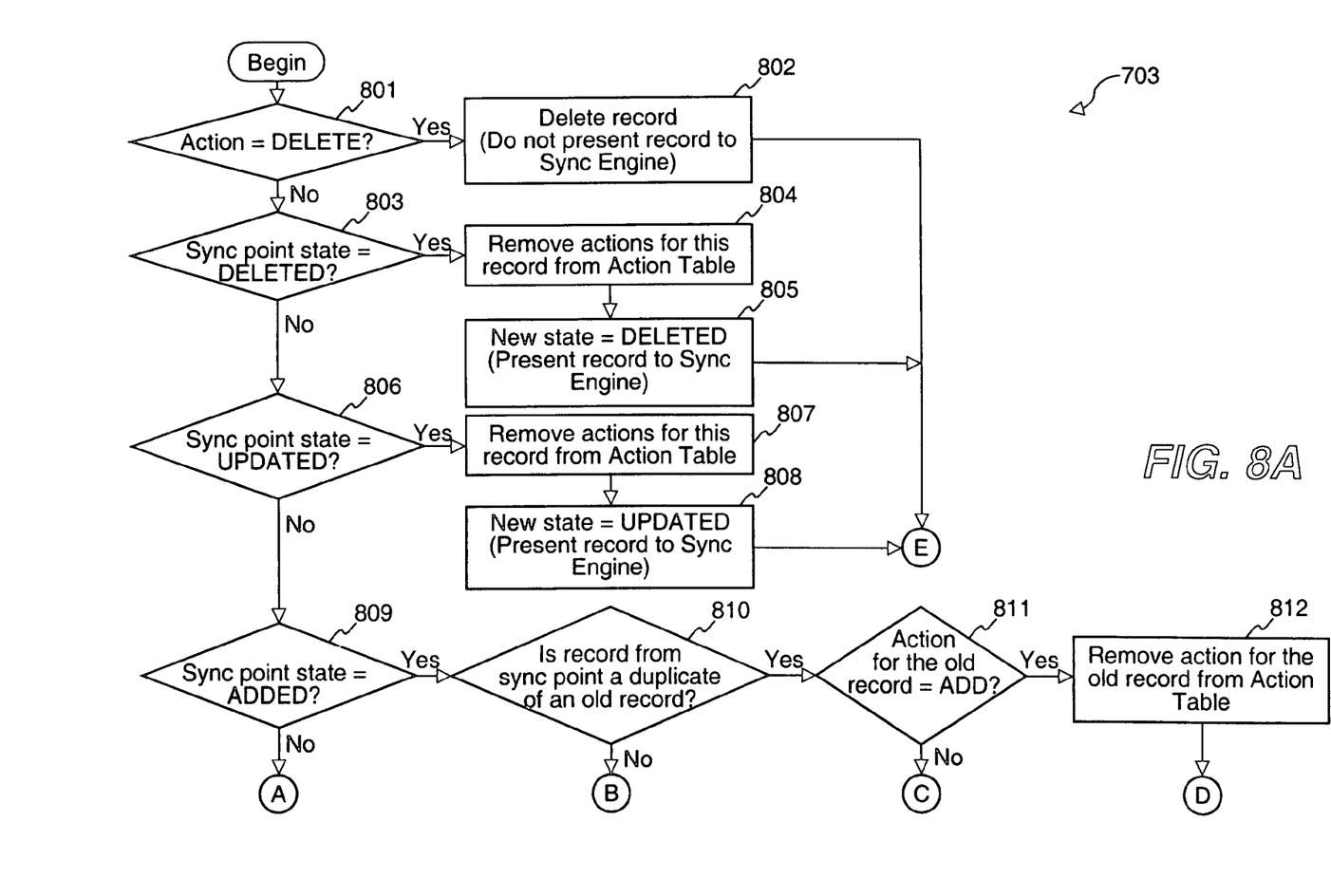
FIG. 8 is a flow diagram illustrating in greater detail the operation of determining actual contact states, according to one embodiment.
Figure 8B:
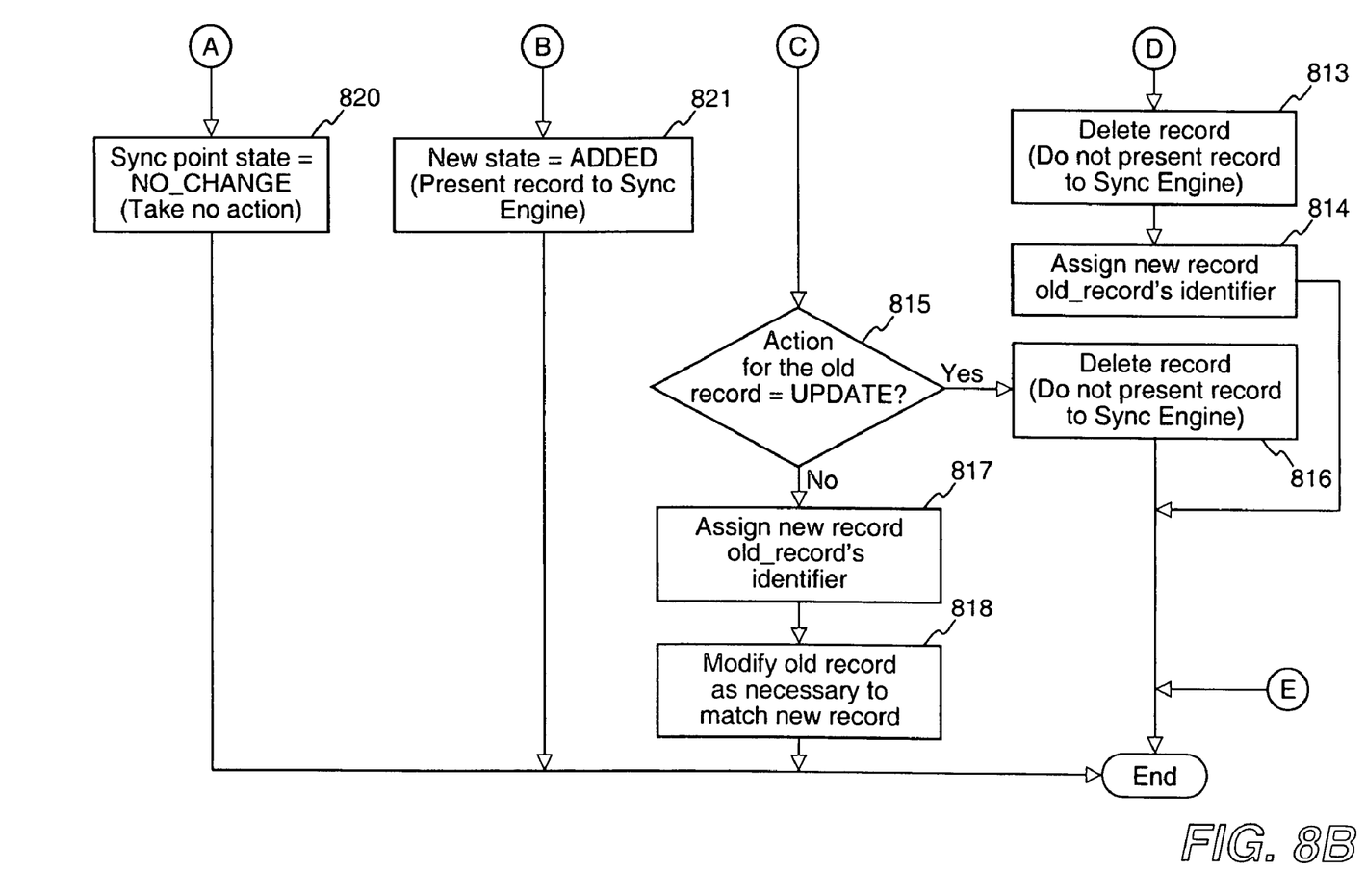

FIG. 8 shows in greater detail the process of block 703 in which the recovery module 32 determines the actual states of the data records on a sync point 2, according to one embodiment. This process is carried out for each individual data element of each data record on each sync point 2. Assuming an embodiment which synchronizes PIM data, for example, each record may represent a different personal contact and may include multiple individual data elements, such as address, telephone number, e-mail address, etc. Note that there are four possible data states: ADDED, UPDATED, DELETED, NO_CHANGE. Note also the difference between a data state and a "to do" action: Data states are in the past tense (e.g., ADDED, UPDATED, DELETED), while "to do" actions are in the present tense (e.g., ADD, UPDATE, DELETE).

There are two determining factors in recovery: 1) what the action table recorded as the action to do to a record, and 2) the state returned from the sync point for that record. Thus, the process illustrated in FIG. 8 uses these two factors. Initially, at block 801 it is determined whether the action in the action table for this sync point is DELETE. If so, then this record (e.g., a personal contact) is simply deleted at block 802; that is, it is not presented to the sync engine 31 for use in generating a new truth database and action tables (block 704 of the top-level process). In this case, the record is not presented to the sync engine 31, because on the last synchronization, the sync engine 31 must have already deleted it from the truth database. Note that the "yes" branch from block 801 can apply in any of four possible cases, i.e., when the state of the handset is DELETED, ADDED, NO_CHANGE or UPDATED.

If the action is determined not to be DELETE in block 801, then at block 803 it is determined whether the state of the record, as indicated by the sync point 2, is DELETED. If the state is DELETED, then at block 804 any actions for this record are removed from the action table of this sync point, and the state of this record on the sync point is deemed to be DELETED at block 805. Note that if the record is deleted from the sync point, there is no need for any of the actions from the action table relating to this record, because they do not apply. Therefore, they can be removed.

If instead the sync point state is determined not to be DELETED at block 803, then it is determined at block 806 whether the state of the record from the sync point 2 is UPDATED. If the state is UPDATED, then at block 807 any actions for this record are removed from the action table of this sync point 2, and the state of this record on the sync point 2 is deemed to be UPDATED at block 808. Note that in this case, if the action in the action table is UPDATE for this record and sync point, then this simply means that the sync point has been updated by the user, such that whatever is in the action table for this record is irrelevant. If the action is ADD, it means the communication link was broken after the sync point added the record but before the sync point sent an acknowledgement; now the user has updated the record on the sync point 2. If the action is NO_CHANGE, the record was updated on the sync point 2. If the action is DELETE, this case is handled by block 801.

If the sync point state is determined not to be UPDATED at block 803, then it is determined at block 809 whether the state of the record from the sync point 2 is ADDED. If not, the process ends with block 820, in which the state of this record on the sync point is deemed to be NO_CHANGE. In that case, the action in the action table is simply maintained, as if the sync point was offline. If, however, the sync point state is found to be ADDED at block 809, the process continues from block 810. At block 810 any conventional duplicate detection technique is used to determine whether the record from the sync point 2 is a duplicate of another record. This case might occur if the record added by the sync point 2 is actually an existing record which the sync point 2 mistakenly interpreted as new. If the record is not a duplicate, the process ends with block 821, in which the state of this record on the sync point 2 is deemed to be ADDED. If the sync point record is a duplicate of another record (the "old" record), then the process continues from block 811, in which it is determined whether the action table of this sync point 2 specifies ADD for the old record. If not, the process continues from block 815. If the action table specifies ADD for the old record, the process continues from block 812.

If the action table does not specify ADD at block 811, then at block 815 it is determined whether the action table specifies UPDATE for the old record. If so, then the process ends with block 816, in which the record from the sync point 2 is deleted (i.e., not presented to the sync engine). Note that this is an unlikely scenario. If it occurs, it probably means that the sync engine 31 determined that the record is supposed to be on the sync point 2 and attempted to update it; however, the sync point 2 believes the record has been added.

If the action table does not specify UPDATE for the old record at block 815, it is most likely that this is because the user added this record to the sync point 2 himself. In that event, at block 817 the new record from the sync point 2 is assigned the identifier of the old record, after which the old record is modified as necessary to make it match the new record at block 818. The process then ends.

If the action table is found at block 811 to specify ADD for the old record, then at block 812 the action for the old record is removed from the action table. Following block 812, the record from the sync point 2 is deleted at block 813 (i.e., not presented to the sync engine 31). In that case, the process ends at block 814, in which the "new" record from the sync point 2 is assigned the identifier of the old record. This case can occur when the sync engine 31 requested the sync point 2 to add this entry on the last synchronization, and it was added, but an acknowledgement was not received from the sync point 2.

Figure 9:
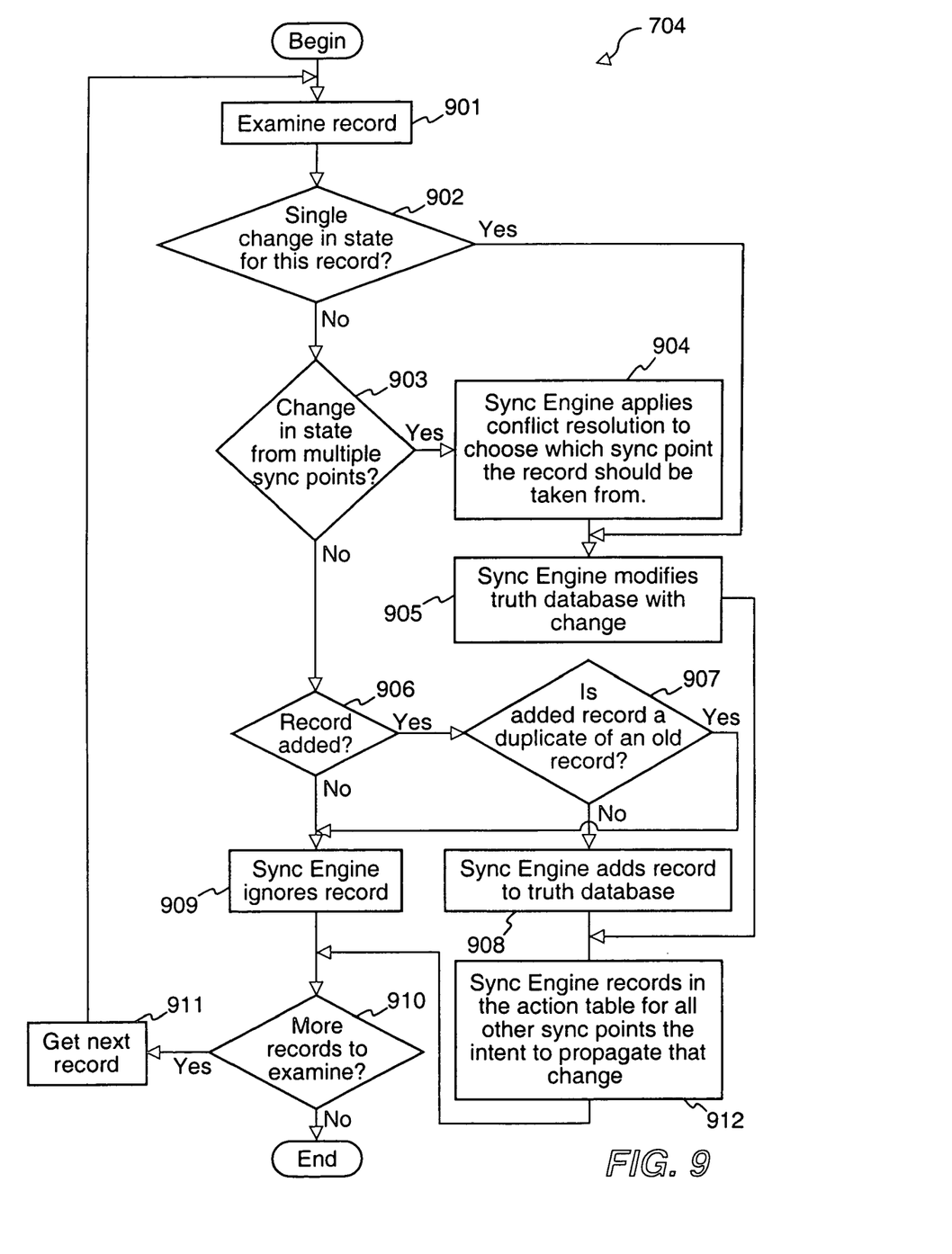
FIG. 9 is a flow diagram illustrating in greater detail the operation of producing a new truth database and action table, according to one embodiment.

FIG. 9 shows in greater detail the process of producing a new truth database and action tables (block 704 in FIG. 7), according to one embodiment. Initially, at block 901 the sync engine 31 examines a record. At block 902 the sync engine 31 determines whether there is only a single change in state for this record, i.e., whether only one sync point 2 has changed the state of the record. If there is only a single change in state, the process branches to block 905, in which the sync engine 31 modifies the truth database to reflect the change. Following block 905, the sync engine 31 records the intent to propagate the change in the action tables of all other sync points 2 at block 912. If there are additional records to examine (block 910), the sync engine 31 accesses the next record at block 911, and the process then loops back to block 901.

If there is not only one change in the state of the record at block 902, then at block 903 the sync engine 31 determines whether there is a change in the state of the record from multiple sync points 2. If so, then at block 904 the sync engine 31 uses any suitable conflict resolution technique to choose from which sync point 2 the state of the record should be taken, for purposes of updating the truth database. As one example of conflict resolution, the sync engine 31 may simply use a previously set user preference indicating the user's preferred prioritization of his sync points 2. Following block 904, the process continues from block 905 as described above.

If there was not a change in state from multiple sync points 2 at block 903, then it is determined at block 906 whether the state of the record is ADDED (as determined by the process of FIG. 8). If so, then at block 907 the sync engine 31 determines whether the added record is a duplicate of an old record. If so, the process continues from block 909, in which the sync engine 31 simply ignores the record. If the added record is not a duplicate, then at block 908 sync engine 31 adds the record to the truth database, and the process continues from block 912 as described above. If the sync engine 31 determines the state of the record is not ADDED at block 906, then the sync engine 31 ignores the record at block 909. Following block 909, the process continues from block 910. If there are no more records to examine at block 910, the process ends.

As noted above, the third main aspect of the synchronization technique is the method by which the sync manager 5 handles an offline sync point 2. The sync manager 5 combines the action table constructed from the online sync points and the truth database (the "new" action table) with the action table residing in the DSS 6 from the prior synchronization (the "old" action table) to produce an effective action table. The effective action table ensures that the appropriate synchronization actions will take place the next time the sync point 2 is online during synchronization.

The process for producing the effective action table is as follows, according to one embodiment. The new action table and the old action table are collectively referred to as the "input" action tables. First, all of the action table entries which do not appear in both input action tables are entered directly into the effective action table. For each remaining entry, the input operators are mapped to an output operator using the table below. In the table below, the action from the new action table selects the column, while the corresponding action from the old action table selects the row. The selected entry is the action that is placed in the corresponding entry of the effective action table. (Note that the asymmetry in the table is an effect of the passage of time.) If the output operator has data associated with it (as with ADD and MODIFY actions), the corresponding data from the truth database data is used.

| Operation | No Change | Add | Delete | Update |
|---|---|---|---|---|
| No Change | No Change | Add | Delete | Update |
| Add | Add | Add | No Change | Add |
| Delete | Delete | Invalid | Delete | Invalid |
| Update | Update | Update | Delete | Update |

For example, suppose the offline sync point 2 had an incomplete action to ADD a certain record. Assume further that subsequently, another sync point 2 UPDATED that record. The UPDATE column and the ADD row yields an output action of ADD, to be placed in the effective action table for that record. This means that at the next synchronization, the offline sync point 2 will have this record added to its database, but with the updated contents.

Figure 10:
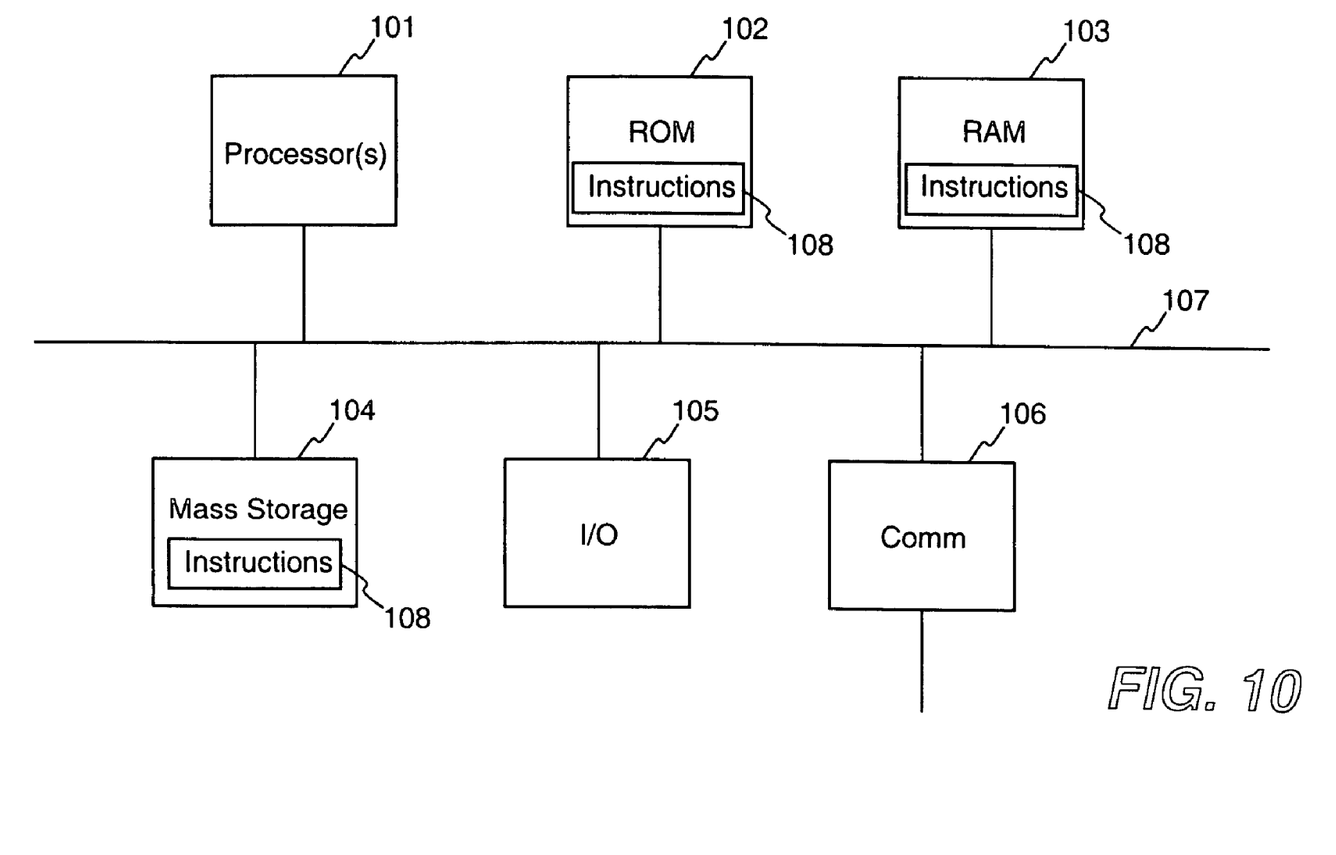
FIG. 10 is a high-level block diagram of a processing system.

FIG. 10 is a block diagram of a processing system that may represent any of the communication and/or processing devices mentioned above (e.g., sync system 1 or sync points 2.). Note that the sync system 1 in particular may be distributed between two or more processing systems such as shown in FIG. 10. The illustrated processing system includes one or more processors 101, i.e. a central processing unit (CPU), read-only memory (ROM) 102, and random access memory (RAM) 103, each connected to a bus system 107. The processor(s) 101 may be, or may include, one or more programmable general-purpose or special-purpose microprocessors, digital signal processors (DSPs), application specific integrated circuits (ASICs), programmable logic devices (PLDs), or a combination of such devices. The bus system 107 includes one or more buses or other connections, which may be connected to each other through various bridges, controllers and/or adapters, such as are well-known in the art. For example, the bus system 107 may include a "system bus", which may be connected through one or more adapters to one or more expansion buses, such as a Peripheral Component Interconnect (PCI) bus, Hyper-Transport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 107 are one or more mass storage devices 104, input/output (I/O) devices 105 and data communication devices 106. Mass storage device 104 may be, or may include, any one or more devices suitable for storing large volumes of data in a non-volatile manner, such as a magnetic disk or tape, magneto-optical (MO) storage device, or any of various forms of Digital Versatile Disk (DVD) or Compact Disk (CD) based storage, or a combination thereof.

Each data communication device 106 is a device suitable for enabling the processing system to communicate data with remote devices or systems and may be, for example, a conventional modem, a Digital Subscriber Line (DSL) modem, a cable modem, an Ethernet adapter, an Integrated Services Digital Network (ISDN) adapter, a wireless transceiver (e.g., in the case of a mobile device), a satellite transceiver, or the like. The I/O device(s) 105 may include, for example, a keyboard or keypad, a display device, and a pointing device (e.g., a mouse, trackball, or touchpad). Note, however, that such I/O devices may be unnecessary for certain devices and/or in certain embodiments. For example, a device which functions purely as a server does not necessarily require local I/O devices aside from a data communication device, particularly if the server is not intended to directly interface with a user or operator. Similarly, it may not be necessary or desirable to equip a mobile sync point with a mass storage device. Many other variations on the above described embodiment other possible. Further, it will be understood that the processing system may include other conventional components such as are well-known in the art.

The sync processes described above may be implemented in software 108, which may reside, either partially or completely, in any of RAM 103, mass storage device 104 and/or ROM 102, as shown.

Thus, a method and apparatus for fault-tolerant synchronization of data between two or more devices, at least one of which is on a relatively unreliable network, have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of synchronizing states of data between a plurality of devices over a communication channel, the method comprising:
    retrieving data from the devices;
    updating centrally stored data, based on the data retrieved from the devices, so as to automatically recover from a prior synchronization failure, including
        updating a truth database representing a true state of the data,
        updating an action database indicating actions to be performed on the devices during a next update,
        creating an effective action database which accounts for any of the devices which were offline during a previous synchronization, and
        saving the truth database and the effective action database in an atomic transaction; and
    updating the data states on the devices based on the updated centrally stored data, including communicating with at least one of the devices over the communication channel and using the effective action database to update the data on the device.

2. A method as recited in claim 1, wherein the communication channel comprises a wireless network.

3. A method as recited in claim 2, wherein the wireless network is a wireless telecommunications network.

4. A method as recited in claim 1, wherein said updating centrally stored data comprises:
    determining actual states of the data on the devices; and
    updating centrally stored data indicating actions to be performed on the devices and states of the data on the devices.

5. A method as recited in claim 4, wherein said updating the data states on the devices comprises updating the data states on the devices based on the data indicating actions to be performed on the devices and data indicating the actual states of the data on the devices.

6. A method of synchronizing states data between a plurality of devices, the method comprising:
    retrieving data from the devices;

automatically recovering from a prior synchronization failure by updating centrally stored data, including
updating a truth database representing a true state of the data,
updating an action database indicating actions to be performed on the devices during a next update,
creating an effective action database which accounts for any of the devices which were offline during a previous synchronization, and
saving the truth database and the effective action database in an atomic transaction; and
updating the data states on the devices, including using the effective action database and communicating with at least one of the devices over a wireless network.

7. A method as recited in claim 6, wherein the wireless network is a wireless telecommunications network.

8. A method as recited in claim 6, wherein said automatically recovering from a synchronization failure comprises:
determining actual states of the data on the devices; and
maintaining centrally stored data indicating actions to be performed on the devices and the actual states of the data on the devices.

9. A method as recited in claim 8, wherein said updating the data states on the devices comprises updating the data states on the devices based on the centrally stored data.

10. A method of performing a synchronization process to synchronize states data between a plurality of devices, the method comprising:
retrieving data from the devices;
maintaining, in persistent storage, data indicating actions to be performed on the devices and data indicating the actual states of the data on the devices;
using a recovery algorithm to determine actual states of the data on the devices;
updating the data indicating actions to be performed on the devices and the data indicating the actual states of the data on the devices, based on results of the recovery algorithm; and
updating the data states on the devices, including communicating with at least one of the devices over a wireless network.

11. A method as recited in claim 10, wherein said updating the data states on the devices comprises updating the data states on the devices based on the data indicating actions to be performed on the devices and data indicating the actual states of the data on the devices.

12. A method as recited in claim 10, wherein the wireless network is a wireless telecommunications network.

13. A method of synchronizing states of data between a plurality of devices, the method comprising:
maintaining a truth database representing a true state of the data;
maintaining an action database indicating actions to be performed on the devices during a next update;
retrieving the data from the devices, including communicating with at least one of the devices over the wireless network;
determining actual current states of individual elements of the data based on the action database and the data retrieved from the devices;
updating the truth database and the action database based on a result of said determining;
creating an effective action database which accounts for any of the devices which were offline during a previous synchronization;
saving the truth database and the effective action database in an atomic transaction; and
updating the data on the devices, including using the effective action database and communicating with at least one of the devices over a wireless telecommunications network.

14. A method as recited in claim 13, wherein said determining comprises determining actual current states of individual elements of the data so as to automatically recover from a synchronization failure.

15. A method as recited in claim 13, wherein the data comprises contact data representing a plurality of contacts.

16. A method of synchronizing states of contact data between a plurality of devices, the method comprising:
maintaining a truth database representing a true state of the contact data, the contact data representing a plurality of contacts;
maintaining an action table for each of the devices, the action table indicating actions to be performed on the corresponding device during a next update;
retrieving contact data from the devices, including communicating with at least one of the devices over a wireless telecommunications network;
determining actual current states of the contacts on the devices based on the contact data retrieved from the devices and the action tables, so as to automatically recover from a synchronization failure;
updating the truth database and the action tables based on a result of said determining;
creating an effective action table for at least one of the devices based on the updated action table for the device and a previous version of the action table for the device, to account for any of the devices which were offline during a most-recent synchronization;
saving the truth database and the effective action table in an atomic transaction; and
using the effective action table to update the states of the contact data on the devices, including communicating with at least one of the devices over the wireless telecommunications network.

17. An apparatus to synchronize data states between a plurality of devices, the apparatus comprising:
a database system to store
a truth database representing a true state of the data, and
an action database indicating actions to be performed on the devices during a next update;
a recovery unit to determine actual current states of the data based on the action database and data retrieved from the devices; and
a synchronization engine to update the truth database and the action database, based on output of the recovery module, and to update data states on the devices based on the action database, by communicating with at least one of the devices over the wireless network.

18. An apparatus as recited in claim 17, wherein the wireless network is a wireless telecommunications network.

19. An apparatus as recited in claim 17, wherein the synchronization engine further is to update the truth database and the action database, based on output of the recovery module, so as to automatically recover from a failure of a prior synchronization.

20. A machine-readable program storage medium storing instructions which, when executed in a processing system, cause the processing system to perform a method of synchronizing states of data between a plurality of devices, at least one of which is a mobile device operating on a wireless telecommunications network, the method comprising:
maintaining a truth database representing a true state of the data;

maintaining an action database indicating actions to be performed on the devices during a next update;

retrieving the data from the devices, including communicating with at least one of the devices over the wireless telecommunications network;

determining actual current states of individual elements of the data based on the action database and the data retrieved from the devices;

updating the truth database and the action database based on a result of said determining;

creating effective action database which accounts for any of the devices which were offline during a previous synchronization;

saving the truth database and the effective action database in an atomic transaction; and updating the data on the devices, including using the effective action database and communicating with at least one of the devices over the wireless telecommunications network.

21. A machine-readable program storage medium as recited in claim 20, wherein said determining comprises determining actual current states of individual elements of the data so as to automatically recover from a synchronization failure.

22. A machine-readable program storage medium as recited in claim 20, wherein the data comprises contact data representing a plurality of contacts.

23. A processing system comprising:

a processor;

a data communication device coupled to the processor to communicate data with a plurality of remote devices, at least one of which operates on a wireless telecommunications network; and a storage facility coupled to the processor and storing instructions for execution by the processor to cause the processing system to perform a method comprising:

maintaining a truth database representing a true state of data maintained by the devices;

maintaining an action database indicating actions to be performed on the devices during a next update;

retrieving the data from the devices, including communicating with at least one of the devices over the wireless telecommunications network;

determining actual current states of individual elements of the data based on the action database and the data retrieved from the devices;

updating the truth database and the action database based on a result of determining the actual current states of individual elements of the data;

creating an effective action database which accounts for any of the devices which were offline during a previous synchronization;

saving the truth database and the effective action database in an atomic transaction; and using the effective action database to update the data on the devices, including communicating with at least one of the devices over the wireless telecommunications network.

24. A processing system as recited in claim 23, wherein the data comprises contact data representing a plurality of contacts.

25. A processing system as recited in claim 23, wherein said creating an effective action database comprises creating the effective action database based on the updated action table and a previous version of the action database to account for any of the devices which were offline during a most-recent synchronization.

* * * * *